US011510393B2

(12) United States Patent
Barnard et al.

(10) Patent No.: US 11,510,393 B2
(45) Date of Patent: Nov. 29, 2022

(54) ANIMAL GROOMING APPARATUS

(71) Applicants: Sharon Barnard, Ocala, FL (US); Jeffrey Feinstein, Ocala, FL (US)

(72) Inventors: Sharon Barnard, Ocala, FL (US); Jeffrey Feinstein, Ocala, FL (US)

( * ) Notice: Subject to any disclaimer, the term of this patent is extended or adjusted under 35 U.S.C. 154(b) by 870 days.

(21) Appl. No.: 16/056,362

(22) Filed: Aug. 6, 2018

(65) Prior Publication Data

US 2019/0098870 A1 Apr. 4, 2019

Related U.S. Application Data

(60) Provisional application No. 62/568,236, filed on Oct. 4, 2017.

(51) Int. Cl.
*A01K 13/00* (2006.01)

(52) U.S. Cl.
CPC .... *A01K 13/002* (2013.01); *A46B 2200/1093* (2013.01)

(58) Field of Classification Search
CPC ................ A01K 13/002; A46B 5/0004; A46B 15/0055; A46B 2200/1093; A46B 15/0059
USPC .......... 119/613, 601, 612, 615, 617; 15/106, 15/105, 111, 176.1
See application file for complete search history.

(56) References Cited

U.S. PATENT DOCUMENTS 200,218 A * 2/1878 Nicholson .......... A46B 15/0002 15/105
208,879 A 10/1878 Hotghkiss
246,526 A * 8/1881 Manker ................ A01K 13/002 119/613
862,918 A * 8/1907 Howard ........................ 119/615
863,457 A * 8/1907 Seymour .............. A01K 13/002 119/613
1,078,556 A * 11/1913 Rogers ............................ 15/106
1,085,063 A * 1/1914 Prouty et al. ........... B26B 19/24 119/617
5,067,444 A 11/1991 Parker
5,960,745 A 10/1999 Boyland
D434,566 S * 12/2000 Mann ............................. D32/35
D509,032 S * 8/2005 Dunn ........................... D30/158
7,198,048 B2 * 4/2007 Johnson ................... A46B 7/04 132/122
D616,649 S * 6/2010 Lin ............................... D4/120
D646,898 S * 10/2011 Raven ............................ D4/118
(Continued)

FOREIGN PATENT DOCUMENTS

WO WO-2016139661 A1 * 9/2016 ............. A46B 3/005

*Primary Examiner* — Yvonne R Abbott-Lewis
(74) *Attorney, Agent, or Firm* — Michael C. Balaguy

(57) ABSTRACT

An apparatus for grooming an animal is disclosed herein. The apparatus for grooming the animal includes a handle and a grooming-head. In a preferred embodiment, the handle is ergonomically shaped to aid in grip-ability of the handle. In one embodiment, the grooming-head includes a first grooming-side having a first grooming-tool. In another embodiment, the grooming-head further includes a second grooming-side opposite the first grooming-side and including a second grooming-tool. Further, in the preferred embodiment, the first grooming-tool and the second grooming-tool are dissimilar. The apparatus is useful for providing effective multifunctional grooming of horses, canines, livestock, etc., saving time and effort while currying.

12 Claims, 6 Drawing Sheets

100
127
132
127
130
136
134
127
126
127
110
120
114

(56) References Cited

U.S. PATENT DOCUMENTS

| | | | | |
|---|---|---|---|---|
| D671,281 | S * | 11/2012 | Singer | D30/158 |
| D675,026 | S * | 1/2013 | Seehoff | D4/120 |
| 8,595,887 | B2 * | 12/2013 | Hiltmann | A01K 13/002 15/187 |
| 9,027,511 | B2 | 5/2015 | Perkins | |
| 2004/0255416 | A1 * | 12/2004 | Hohlbein | A46B 5/02 15/106 |
| 2008/0066690 | A1 * | 3/2008 | Rosen | A01K 13/002 119/612 |
| 2012/0055416 | A1 | 3/2012 | Forgues | |
| 2013/0247533 | A1 * | 9/2013 | Zupan | A01D 7/08 56/400.04 |

* cited by examiner

ANIMAL GROOMING APPARATUS

CROSS REFERENCE TO RELATED APPLICATION

The present application is related to and claims priority to U.S. Provisional Patent Application No. 62/568,236 filed Oct. 4, 2017, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. FIELD OF THE INVENTION

The present invention relates generally to the field of grooming tools and more specifically relates to an ergonomically shaped tool for grooming an animal.

2. DESCRIPTION OF RELATED ART

The benefits of grooming animals are well known and include maintaining the health of the animal and improving the attractiveness of the riding experience. Grooming acts to remove hair that has been shed from the coat of the animal, dislodge parasites, and cleanse the coat of mud, burrs, dust, and other detritus. Grooming also stimulates the skin underlying the coat and may improve circulation. Among the activities that comprise grooming, are removal of stones, mud, and vegetable matter from the hooves and shoes.

In particular, horses must be groomed immediately before and after they are ridden or worked in harness to protect their skin from galling and to keep them healthy and presentable. Traditional curries for grooming horses, canines, livestock, etc., are designed for the user to hold the body of the curry comb in hand. This is typically unstable and tends to fall out of the user's hand. An effective alternative is needed.

U.S. Pat. No. 5,960,745 to Leslie J. Boyland relates to a horse grooming device. The described horse grooming device includes both relatively stiff and relatively flexible bristles extending in generally opposite directions to one another. A currycomb is formed by projections extending from the sides of the brush, and a rigid hoof pick is supported on one end.

BRIEF SUMMARY OF THE INVENTION

In view of the foregoing disadvantages inherent in the known grooming tools art, the present disclosure provides a novel animal grooming apparatus. The general purpose of the present disclosure, which will be described subsequently in greater detail, is to provide an ergonomically shaped grooming tool to allow for effective multifunctional grooming of horses, canines, livestock, etc., saving time and effort whilst currying. In one embodiment, the grooming tool is one-sided; in another embodiment, the grooming-tool is double-sided.

An apparatus for grooming an animal is disclosed herein. The apparatus includes a handle including a first-end, a second-end opposite the first-end, and an elongate member extending therebetween, the elongate member having a length measured from the first-end to the second-end, and a grooming-head may be attached to the second-end of the handle. The length of the handle may be ergonomically shaped to aid in grip-ability of the handle. Further, the grooming-head may be attached to the second-end of the handle and include a first-grooming-side including a first grooming-tool.

A method of using apparatus for grooming an animal is also disclosed herein. The method of using the apparatus includes the steps of: providing the apparatus as above; holding the handle at the first-end such that the first grooming-side may be proximate to the body of the animal; and brushing the hair of the animal with the first grooming-tool of the first grooming-side.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an animal grooming apparatus, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to grooming tools and more particularly to an animal grooming apparatus as used to improve the double-sided tool for grooming an animal.

Generally, disclosed is a multipurpose grooming tool equipped with both soft and hard bristles on an ergonomic handle. The tool may include a cross-shaped system of soft bristles on one side of the tool for grooming the face, legs, underbelly, and other sensitive areas. Further, a set of hard nubs may be located on another side of the grooming tool for loosening mud, dried sweat, dirt, debris, and the like, while bringing body oil to the skin surface. The grooming tool may feature a comfortable and ergonomic gripping handle which could help relieve stress on the user's hands, elbows, or arms. This allows the groomer to groom consistently, in numerous directions, without the curry slipping from the hand. The grooming tool may be designed to enable easier grooming of a horses, canines, livestock, etc., eliminating the need for multiple tools. The grooming tool may be used in a circular, side-to-side, or up-and-down motion.

The grooming tool may be constructed using plastic, silicone, rubber, and other suitable materials. The entire grooming tool may be lightweight and easy-to-use. The handle may measure approximately 6" in length while the round section may measure approximately 3.75" in diameter. Exact size, measurement, construction, and design specifications may vary upon manufacturing.

Referring now more specifically to the drawings by numerals of reference, there is shown in FIGS. 1-6, various views of an apparatus 100.

Figure 1:
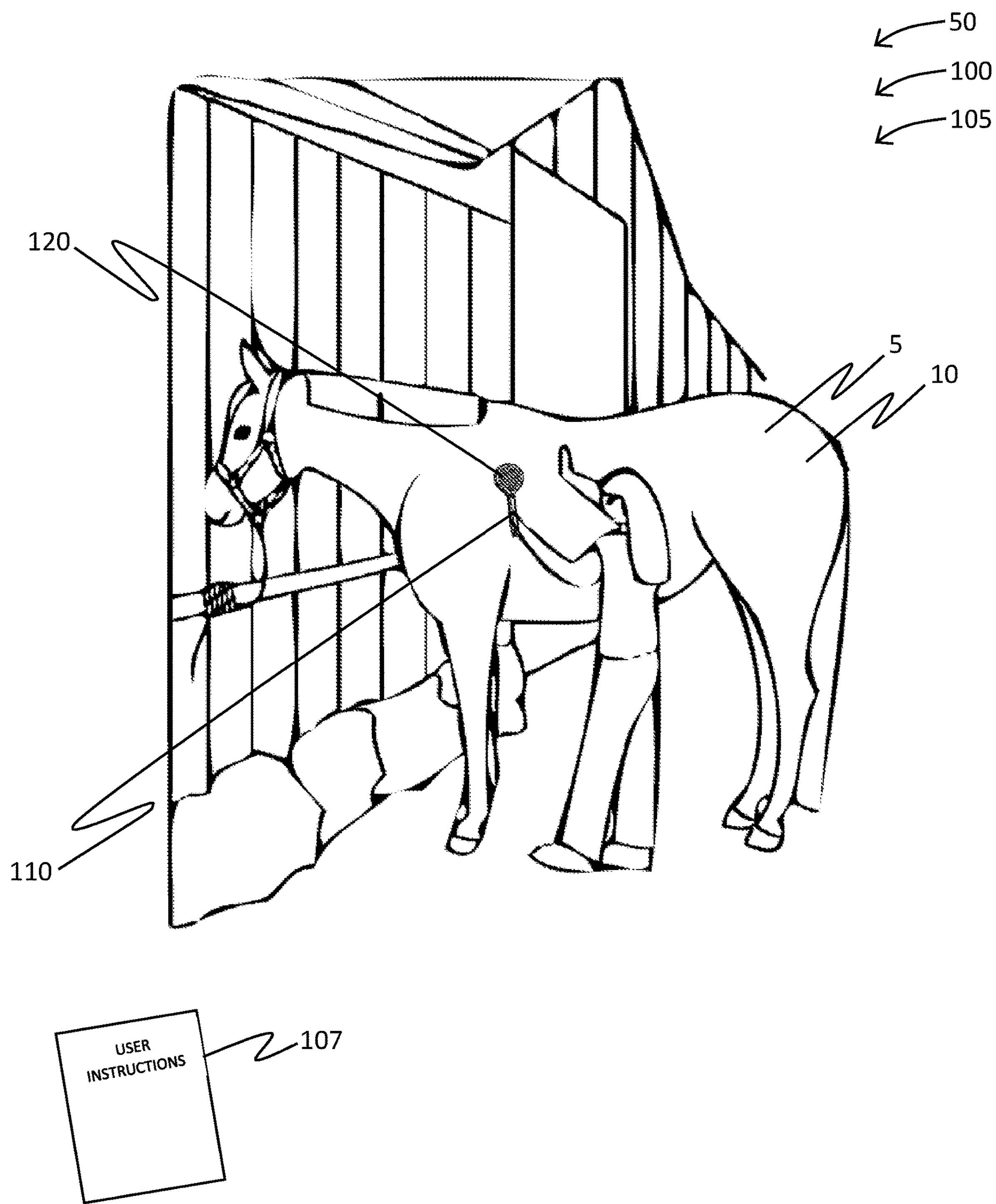
FIG. 1 is a perspective view of the apparatus during an 'in-use' condition, according to an embodiment of the disclosure.

FIG. 1 shows an apparatus 100 during an 'in-use' condition 50, according to an embodiment of the present disclosure. As illustrated, the apparatus 100 may include a handle 110 and a grooming-head 120. As shown, the apparatus 100 may be used for grooming an animal 10 having a body 5 with hair thereon.

According to one embodiment, the apparatus 100 may be arranged as a kit 105. The kit 105 may include set of user instructions 107. The instructions may detail functional relationships in relation to the structure of the apparatus 100 (such that the apparatus 100 can be used, maintained, or the like, in a preferred manner).

Figure 2:
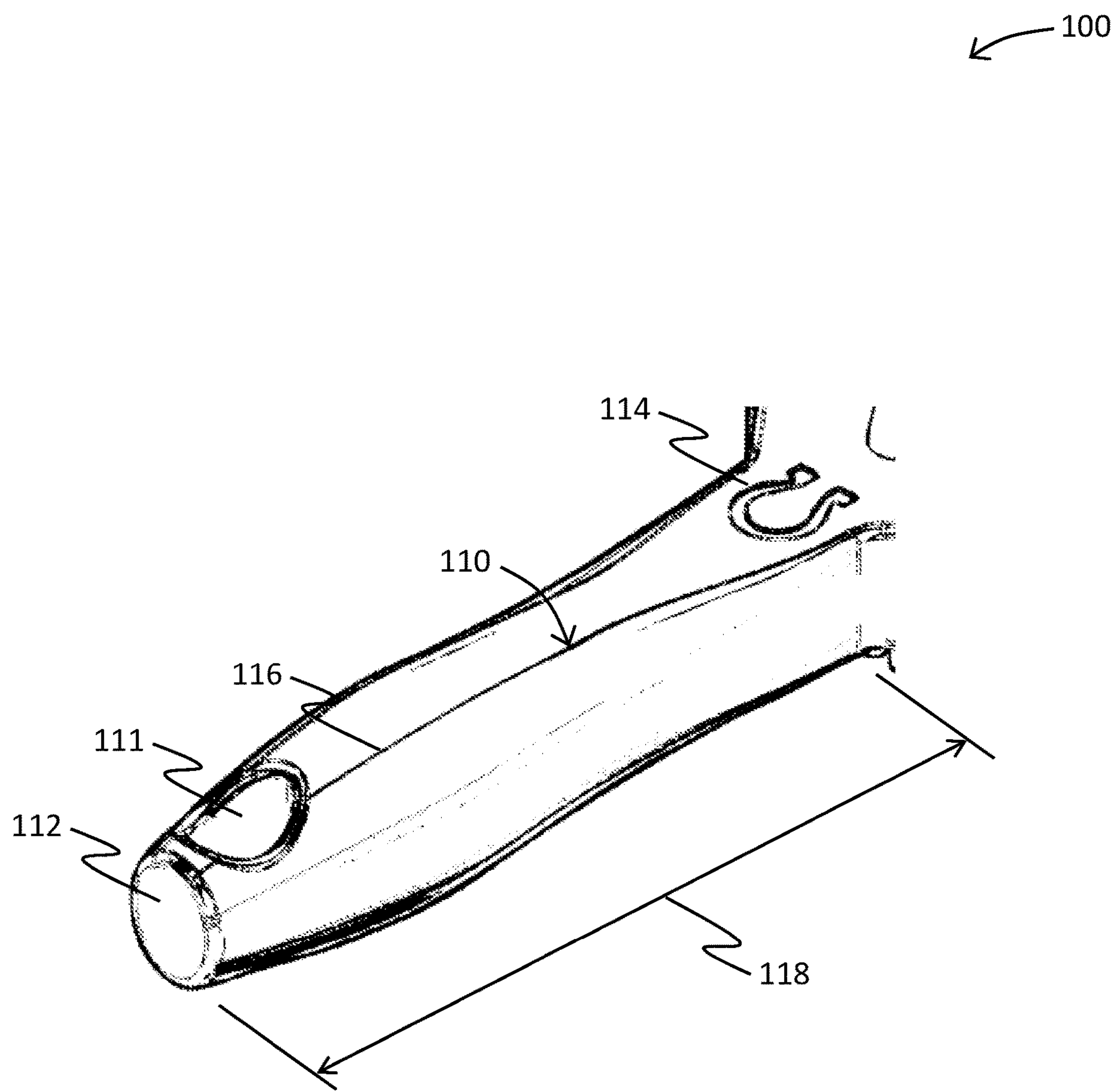
FIG. 2 is a detailed view of the apparatus of FIG. 1, according to an embodiment of the present disclosure.

FIG. 2 is a detail view of the apparatus 100 of FIG. 1, according to an embodiment of the present disclosure. In particular, shown here is a close-up view of the handle 110. As shown, the handle 110 may include a first-end 112, a second-end 114 opposite the first-end 112, and an elongate member 116 extending therebetween. The second-end 114 may be defined as the transition between the handle 110 and the grooming-head 120. The elongate member 116 may include a length 118 measured from the first-end 112 to the second-end 114 and an aperture 111 proximate the first-end 112. The aperture 111 may be sized and dimensioned to receive a hook such that a user is able to easily store the apparatus 100 when not in use.

In a preferred embodiment, the length 118 of the elongate member 116 may be between 5-8 inches. However, it is contemplated that in other embodiments the length 118 may be shorter than 5 inches or longer than 8 inches. The elongate-member 116 may be ergonomically-shaped to allow for better gripability. Further, in one embodiment, the elongate member 116 may include grooves thereon to aid in the gripability. Materials contemplated for the construction of the handle 110 may be a plastic material, silicone, rubber, wood, metal, and the like.

Figure 3:
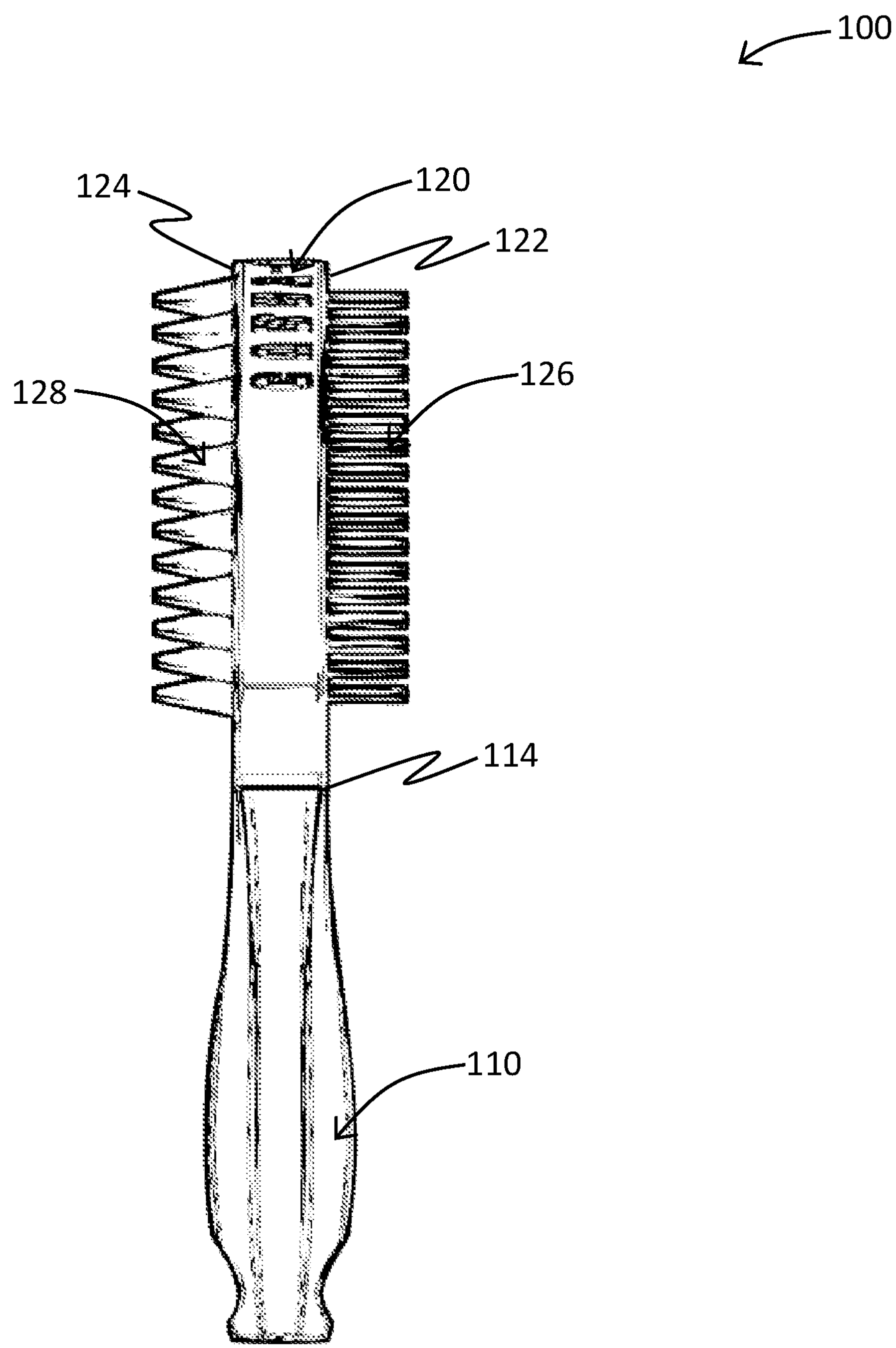
FIG. 3 is a side view of the apparatus of FIG. 1, according to an embodiment of the present disclosure.

FIG. 3 is a side view of the apparatus 100 of FIG. 1, according to an embodiment of the present disclosure. As shown, the grooming-head 120 may be attached to or otherwise transition to the handle 110 at the second-end 114. In one embodiment, the grooming-head 120 may include a first-grooming side 122 having a first grooming-tool 126. In another embodiment, the grooming-head 120 may include a first-grooming-side 122 and a second-grooming-side 124 opposite the first-grooming-side 122. The first-grooming side may include a first grooming-tool 126 and the second-grooming-side 124 may include a second grooming-tool 128. In the preferred embodiment, the first grooming-tool 126 may be dissimilar from the second grooming-tool 128.

Figure 4:
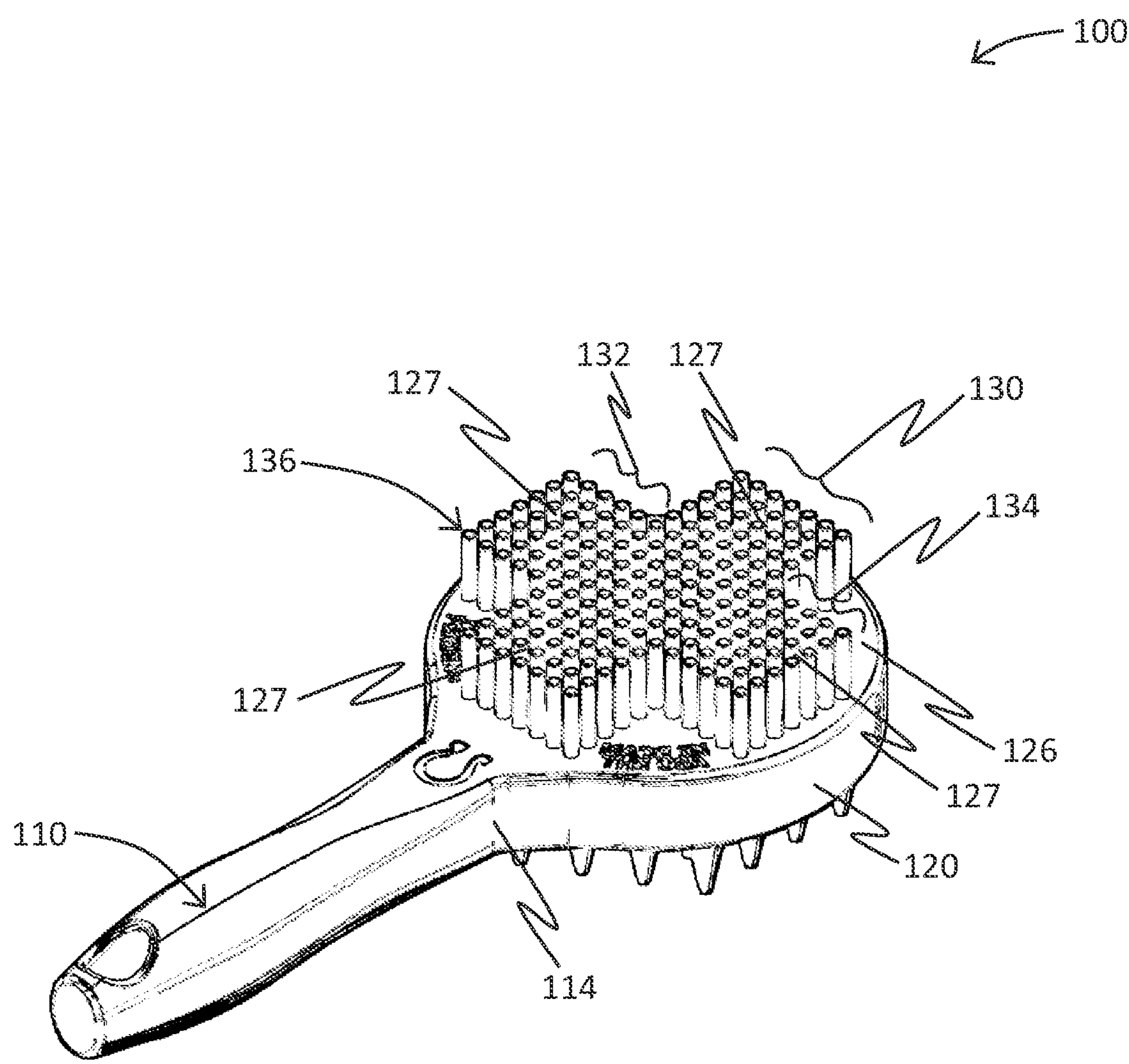
FIG. 4 is a perspective view of the apparatus of FIG. 1, according to an embodiment of the present disclosure.

FIG. 4 is a perspective view of the apparatus 100 of FIG. 1, according to an embodiment of the present disclosure. As illustrated here, the first grooming-tool 126 may include a plurality of bristles 127 configured to brush the hair of animal 10 (FIG. 1). In the preferred embodiment, the plurality of bristles 127 may be arranged in a cross-shaped configuration. As illustrated, plurality of bristles 127 includes vertical-array of bristles 130, left-horizontal-array of bristles 132, and right-horizontal-array of bristles 134. For the purposes of this specification, the term "vertical" is used to indicate an axis parallel to the handle 110 (FIG. 1), and the term "horizontal" is used to indicate an axis perpendicular to the handle 110 (FIG. 1). In this configuration, as illustrated, plurality of bristles 127 is defined by at least twelve edges 136.

The material that the grooming-head 120 may be constructed of may be the same material as the handle 110; and as above, the materials contemplated may be plastic material, silicone, rubber, wood, metal, and the like. As shown, the grooming-head 120 and the second-end 114 of the handle 110 may include engravings therein. The engravings may be decorative or functional in that a name of the animal 10 (FIG. 1) may be etched therein to allow the owner to easily identify the correct apparatus 100. Materials contemplated for construction of the plurality of bristles 127 includes silicone-material, rubber-material, plastic-material, synthetic hair, natural hair, and the like. However, it should be appreciated that this list is not exhaustive.

Figure 5:
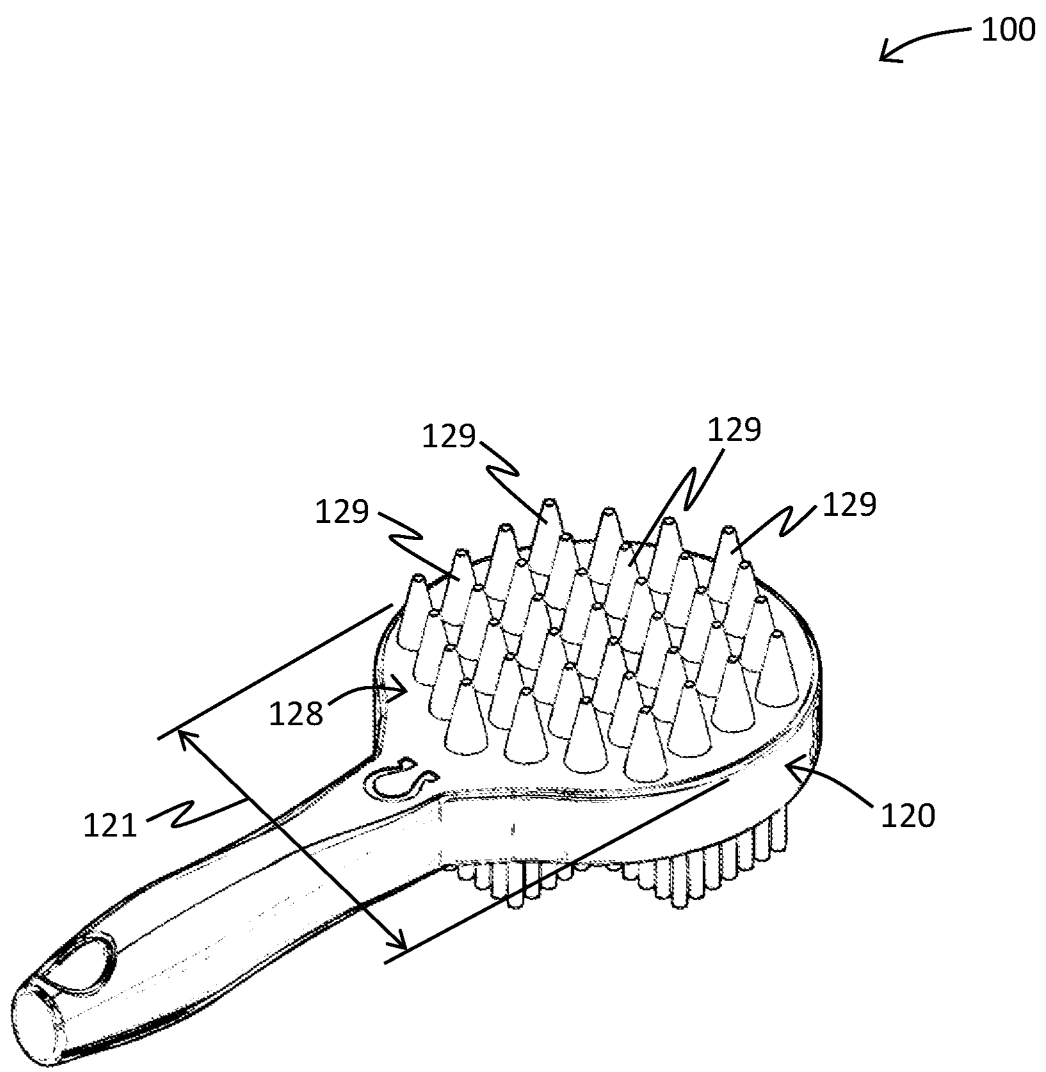
FIG. 5 is an opposing perspective view of the apparatus of FIG. 4, according to an embodiment of the present disclosure.

FIG. 5 is an opposing perspective view of the apparatus 100 of FIG. 4, according to an embodiment of the present disclosure. As shown in this figure, the second grooming-tool 128 may include at least one massaging-nodule 129 configured to massage the body 5 (FIG. 1) of the animal 10 (FIG. 1).

In the preferred embodiment, the at least one massaging-nodule 129 may include a plurality of massaging-nodules 129. As illustrated, in one embodiment, the at least one massaging-nodule 129 may have a cone-like shape including a rounded-tip, configured to aid in the massage. Materials contemplated for construction of the at least one massaging-nodule 129 may be silicone-material, rubber-material, plastic-material, and the like. It is contemplated that the at least one massaging-nodule 129 should be made from a material that is soft but firm so as to allow for effective massage, but so as to not hurt the animal 10.

In the preferred embodiment, the grooming-head 120 may include a circular or otherwise rounded shape. This shape may be particularly useful for the grooming of the animal 10 as it may allow an owner to brush or massage the animal 10 using circular motions to help loosen dirt and hair, and to also stimulate the skin to produce natural oils. This may be particularly useful when using the second grooming-tool 128 including the at least one massaging-nodule 129 as circular motions may aid in massage and stimulation of the skin of the animal 10. Further to this, in the preferred embodiment, the grooming-head 120 may include a diameter 121 of between 3-5 inches. However, it should be appreciated that in other embodiments the grooming-head 120 may include the diameter 121 of different sizes.

Figure 6:
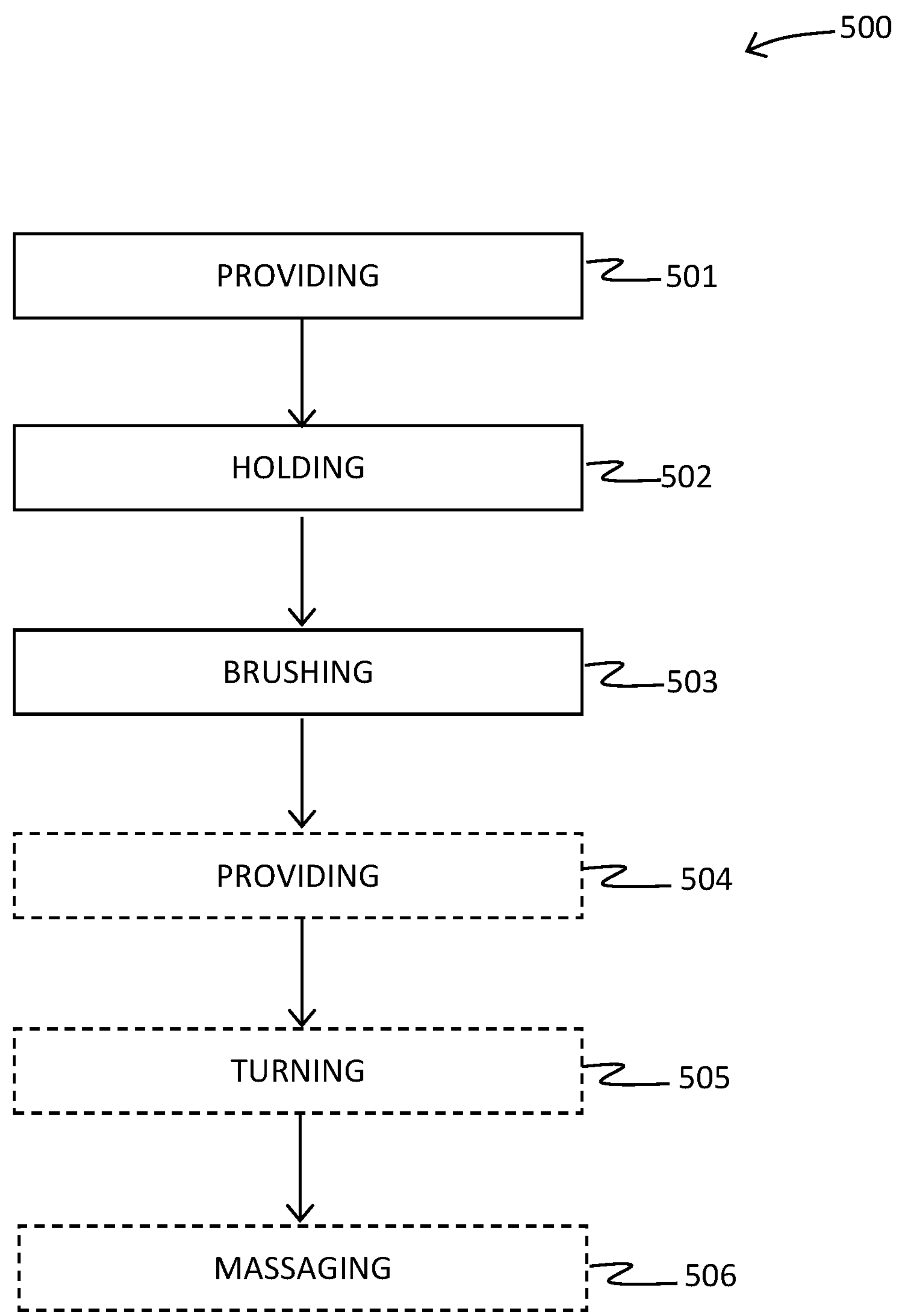
FIG. 6 is a flow diagram illustrating a method of use for apparatus, according to an embodiment of the present disclosure.

FIG. 6 is a flow diagram illustrating a method of using an apparatus for grooming an animal, according to an embodiment of the present disclosure. As illustrated, the method 500 of using an apparatus for grooming an animal may include the steps of: step one 501, providing the apparatus 100 as described above; step two 502, holding the handle 110 proximate the first-end 112, and such that the first grooming-side 122 is proximate to the body 5 of the animal 10; and step three 503, brushing the hair of the animal 10 with the first grooming-tool 126 of the first grooming-side 122. Further, the method 500 may include step four 504, providing the apparatus 100 as above; step five 505, turning the apparatus 100 such that the second grooming-side 124 is proximate to the body 5 of the animal 10; and step six 506, massaging the body 5 of the animal 10 with the second grooming-tool 128 of the second grooming-side 124.

It should be noted that step four 504, step five 505 and step six 506 are optional steps and may not be implemented in all cases. Optional steps of method of use 500 are illustrated using dotted lines in FIG. 6 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., and other methods for apparatus 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An apparatus for grooming an animal, the animal having a body with hair thereon, the apparatus comprising:
a handle including a first-end, a second-end opposite the first-end, and an elongate member extending therebetween, the elongate member having a length measured from the first-end to the second-end, and wherein the length is ergonomically shaped to aid in grip-ability of the handle; and
a grooming-head attached to the second-end of the handle, the grooming-head including
a first-grooming-side comprising a first grooming-tool, the first grooming-tool having a plurality of bristles, the plurality of bristles comprising
a vertical-array of bristles,
a left-horizontal-array of bristles extending perpendicularly from the vertical-array of bristles, and
a right-horizontal-array of bristles extending perpendicularly from the vertical-array of bristles in a direction opposite that of the left-horizontal-array of bristles;
such that the vertical-array of bristles, the left-horizontal-array of bristles, and the right-horizontal-array of bristles are each rectangular in shape and in combination thereby define at least twelve distinct brushing edges along a periphery of the plurality of bristles.

2. The apparatus of claim 1, wherein the grooming-head further includes a second-grooming-side opposite the first-grooming side, the second-grooming-side including a second-grooming-tool, the second-grooming-tool comprising a plurality of projections.

3. The apparatus of claim 2, wherein the plurality of projections are made from a silicone-material.

4. The apparatus of claim 2, wherein the plurality of projections are made from a rubber-material.

5. The apparatus of claim 1, wherein the grooming-head has a circular-shape.

6. The apparatus of claim 5, wherein the grooming-head has a diameter of between 3-5 inches.

7. The apparatus of claim 1, wherein the elongate member of the handle includes an aperture proximal to the first-end, said aperture being sized and dimensioned to receive a hook.

8. The apparatus of claim 7, wherein the length of the elongate member is between 5-8 inches.

9. An apparatus for grooming an animal, the animal having a body with hair thereon, the apparatus comprising:
a handle including a first-end, a second-end opposite the first-end, and an elongate member extending therebetween, the elongate member having a length measured from the first-end to the second-end, and wherein the length is ergonomically shaped to aid in grip-ability of the handle; and
a grooming-head attached to the second-end of the handle, the grooming-head including
a first-grooming-side comprising a first grooming-tool, the first grooming-tool having a plurality of bristles, the plurality of bristles comprising
a vertical-array of bristles,
a left-horizontal-array of bristles extending perpendicularly from the vertical-array of bristles, and
a right-horizontal-array of bristles extending perpendicularly from the vertical-array of bristles in a direction opposite that of the left-horizontal-array of bristles;
such that the vertical-array of bristles, the left-horizontal-array of bristles, and the right-horizontal-array of bristles are each rectangular in shape and in combination thereby define at least twelve distinct brushing edges along a periphery of the plurality of bristles;
wherein one of the first grooming-tool includes a plurality of bristles configured to brush the hair of the animal;
wherein the plurality of bristles are arranged in a cross-shaped configuration;
wherein the second grooming-tool includes at least one massaging-nodule configured to massage the body of the animal;
wherein the grooming-head has a circular shape;
wherein the grooming-head has a dimeter of between 3-5 inches;
wherein the elongate member of the handle includes an aperture proximate the first-end, said aperture sized and dimensioned to receiving a hook; and
wherein the length of the elongate member is between 5-8 inches.

10. The apparatus of claim 9, further comprising a set of instructions; and
wherein the apparatus is arranged as a kit.

11. A method of using an apparatus for grooming an animal, the animal having a body with hair thereon, the method comprising the steps of:

providing the apparatus of claim 1;

holding the handle at the first-end such that the first grooming-side is proximate to the body of the animal; and brushing the hair of the animal with the first grooming-tool of the first grooming-side.

12. The method of claim 11, further comprising the steps of:

providing the apparatus further including the grooming-head having a second-grooming-side opposite the first-grooming-side, the second-grooming-side including a second-grooming-tool, and wherein the first grooming-tool is dissimilar from the second-grooming-tool;

turning the apparatus such that the second grooming-side is proximate to the body of the animal; and massaging the body of the animal with the second grooming-tool of the second grooming-side.

* * * * *